(12) United States Patent
Wang

(10) Patent No.: US 11,502,370 B2
(45) Date of Patent: Nov. 15, 2022

(54) CYLINDRICAL OR BUTTON BATTERY

(71) Applicant: Shengyi Wang, Dongguan (CN)

(72) Inventor: Shengyi Wang, Dongguan (CN)

(73) Assignee: Guangdong Mic-Power New Energy Co., Ltd., Huizhou (CN)

( * ) Notice: Subject to any disclaimer, the term of this patent is extended or adjusted under 35 U.S.C. 154(b) by 84 days.

(21) Appl. No.: 16/880,361

(22) Filed: May 21, 2020

(65) Prior Publication Data

US 2020/0280036 A1 Sep. 3, 2020

Related U.S. Application Data

(63) Continuation of application No. PCT/CN2017/118910, filed on Dec. 27, 2017.

(30) Foreign Application Priority Data

Nov. 22, 2017 (CN) .......................... 201711173624.3
Nov. 22, 2017 (CN) .......................... 201721581289.6

(51) Int. Cl.
*H01M 50/342* (2021.01)
*H01M 50/153* (2021.01)
*H01M 50/183* (2021.01)
*H01M 50/528* (2021.01)
*H01M 50/572* (2021.01)

(52) U.S. Cl.
CPC ..... *H01M 50/3425* (2021.01); *H01M 50/153* (2021.01); *H01M 50/183* (2021.01); *H01M 50/528* (2021.01); *H01M 50/572* (2021.01)

(58) Field of Classification Search
CPC ......................... H01M 50/183; H01M 10/4228
See application file for complete search history.

(56) References Cited

U.S. PATENT DOCUMENTS

| | | | | |
|---|---|---|---|---|
| 3,956,012 A | * | 5/1976 | Scholle | H01M 4/72 429/234 |
| 2004/0191622 A1 | * | 9/2004 | Han | H01M 10/0585 429/174 |
| 2005/0079413 A1 | * | 4/2005 | Schubert | H01M 10/0525 429/185 |
| 2010/0047666 A1 | * | 2/2010 | Tatsumi | H01M 12/06 29/731 |
| 2011/0250495 A1 | * | 10/2011 | Webber | H01M 10/488 429/188 |
| 2016/0268558 A1 | * | 9/2016 | Sawayama | H01M 10/0569 |
| 2018/0175455 A1 | * | 6/2018 | Bao | H01M 10/0525 |

* cited by examiner

*Primary Examiner* — Brian R Ohara
*Assistant Examiner* — Emily Elizabeth Freeman
(74) *Attorney, Agent, or Firm* — Baker Botts LLP

(57) ABSTRACT

The present disclosure discloses a cylindrical or button battery. The battery includes a cap, a shell and a ring seal, wherein the cap and the shell are both of a tubular structure having a cover portion and are fitted together to form a hermetic space for accommodating a battery cell; the ring seal is located between a side wall of the cap and a side wall of the shell and is capable of shrinking or being torn when reaching a set temperature so as to form a slit between the side wall of the cap and the side wall of the shell to release pressure. The ring seal of the battery can shrink or be torn at the set temperature to release pressure, and therefore the battery is characterized by excellent safety.

12 Claims, 2 Drawing Sheets

CYLINDRICAL OR BUTTON BATTERY

CROSS-REFERENCE TO RELATED APPLICATIONS

This application is a Continuation of International Application No. PCT/CN2017/118910, filed on Dec. 27, 2017, which claims priority to Chinese Patent Application No. 201711173624.3, filed on Nov. 22, 2017, and Chinese Patent Application No. 201721581289.6, also filed on Nov. 22, 2017, all of which are hereby incorporated by reference in their entireties.

TECHNICAL FIELD

The present disclosure relates to the technical field of battery, and more particularly to a cylindrical or button battery.

BACKGROUND

Conventionally, a cylindrical or button battery includes a cap, a shell, and a battery cell. The cap and the shell are fitted together to form a hermetic space inside them. The cap and the shell are made of metal such as stainless steel. The battery cell is located in the hermetic space. The battery cell has a positive electrode tab connected to the cap, and a negative electrode tab connected to the shell. The cap serves as a positive electrode of the battery, while the shell serves as a negative electrode of the battery. There is provided a ring seal between the positive electrode and the negative electrode. With the ring seal, the cap and the shell are sealed, and insulated from each other.

In the case that short circuit, overcharging, overloading, or external heating occurs to the battery, a temperature inside the battery will rise, resulting in a gas pressure rise in the hermetic space. Typically in a conventional battery structure, when heated, a ring seal cannot be deformed or torn, or the ring seal expands. Therefore, the cylindrical or button battery is prone to explosion and ignition and as it is impossible to release high-pressure gas, causing a safety accident.

SUMMARY

An object of the present disclosure is to provide a novel technical solution of a cylindrical or button battery.

According to a first aspect of the present disclosure, there is provided a cylindrical or button battery. The battery includes a cap, a shell and a ring seal. The cap and the shell are both of a tubular structure having a cover portion; and are fitted together to form a hermetic space for accommodating a battery cell. The ring seal is located between a side wall of the cap and a side wall of the shell, and is capable of shrinking or being torn when reaching a set temperature so as to form a slit between the side wall of the cap and the side wall of the shell to release pressure.

Optionally, the ring seal is configured to shrink or be torn at or above 100° C.

Optionally, a material of the ring seal includes thermoplastic plastics of at least one of PET, PE, PP, ABS, PVC and EVA.

Optionally, the cap is located inside the shell, and a bottom of the ring seal is of a U-shaped structure wrapping a lower end of the side wall of the cap; or the bottom of the ring seal is of an L-shaped structure abutting against a lower end surface of the side wall of the cap.

Optionally, a groove is formed in the cover portion of the shell, and is configured to release stress generated during assembling.

Optionally, the ring seal is soaked in sealant glue prior to assembling.

Optionally, the cylindrical or button battery further includes a filler which is an insulating material, and the filler covers an external slit between the shell and the cap.

Optionally, the filler is a three-proofing glue or asphalt.

Optionally, the cylindrical or button battery further includes a protective element configured to prevent the battery from overcharging, overdischarging, a short circuit and/or overloading.

Optionally, the cylindrical or button battery further includes a single-strand enameled wire for connecting to an external circuit; and the single-strand enameled wire is directly welded onto at least one of the cap and the shell.

According to an embodiment of the present disclosure, the ring seal shrinks or is torn at a set temperature, so that pressure can be automatically released when a gas pressure inside the cylindrical or button battery is too high. Therefore, explosion of the battery is effectively prevented, which improves safety of the battery and reduces a potential safety hazard.

In addition, pressure in the cylindrical or button battery can be automatically released without an additional pressure release valve. In this way, cost of the battery is reduced, and a manufacturing process of the battery is simplified.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings are incorporated in the description and forming a part thereof, which illustrate the embodiments of the present disclosure and are used to explain the principle of the present disclosure along with the description.

Figure 1:
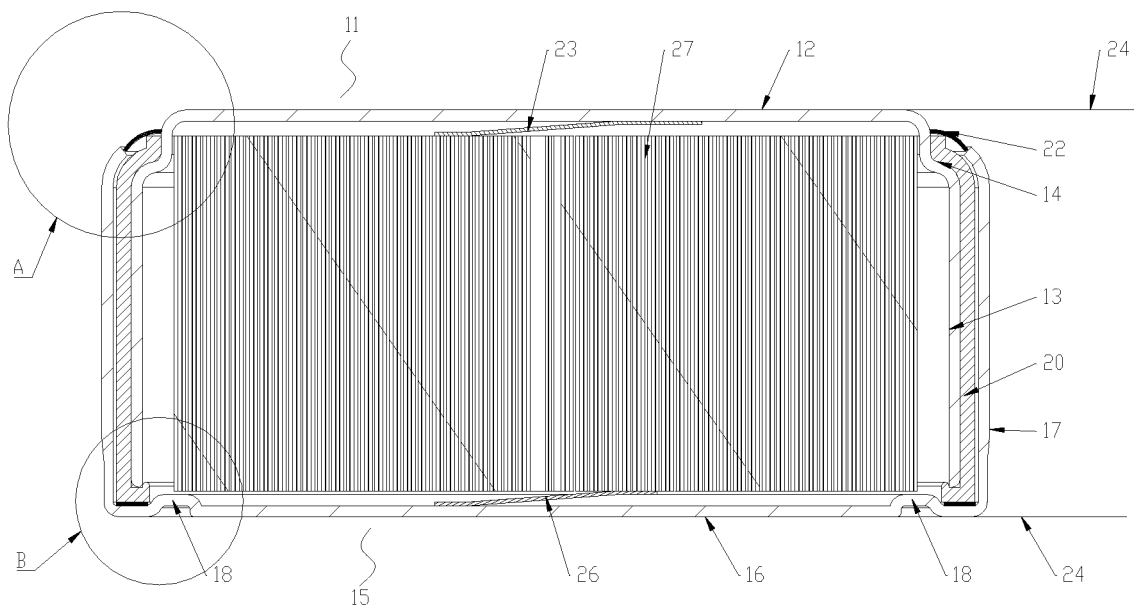
FIG. 1 is a section view of a cylindrical or button battery in accordance with an embodiment of the present disclosure.

The reference signs represent the following components: 11: cap; 12: cover portion of the cap; 13: side wall of the cap; 14: stepped structure; 15: shell; 16: cover portion of the shell; 17: side wall of the shell; 18: groove; 20: ring seal; 21: U-shaped structure; 22: filler; 23: positive electrode tab; 24: single-strand enameled wire; 25: sealing gasket; 26: negative electrode tab; and 27: battery cell.

DETAILED DESCRIPTION

Various exemplary embodiments of the present disclosure will now be described in detail with reference to the accompanying drawings. It should be noted that the relative arrangement, numerical expressions and numerical values of the components and steps set forth in these embodiments do not limit the scope of the present disclosure unless otherwise specified.

The following description of at least one exemplary embodiment is in fact merely illustrative and is in no way intended as a limitation to the present disclosure and its application or use.

Techniques, methods, and devices known to those of ordinary skill in the relevant art may not be discussed in detail but where appropriate, the techniques, methods, and devices should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, there is no need for further discussion in the accompanying drawings.

According to an embodiment of the present disclosure, there is provided a cylindrical or button battery. As shown in FIG. 1, the battery includes a cap 11, a shell 15, and a ring seal 20. Each of the cap 11 and the shell 15 is of a tubular structure having a cover portion. The cap 11 and the shell 15 are fitted together to form a hermetic space for accommodating a battery cell 27.

It should be noted that an open end of the cap 11 and an open end of the shell 15 are fitted with each other. A side wall 13 of the cap intersects a side wall 17 of the shell. The side wall 13 of the cap is inserted into a cavity of the shell 15, and an end of the side wall 17 of the shell is subjected to a crimping process so as to fix the cap 11. Or, the side wall 17 of the shell is inserted into the cavity of the cap 11, and an end of the side wall 13 of the cap is subjected to a crimping process to fix the shell 15.

Figure 2:
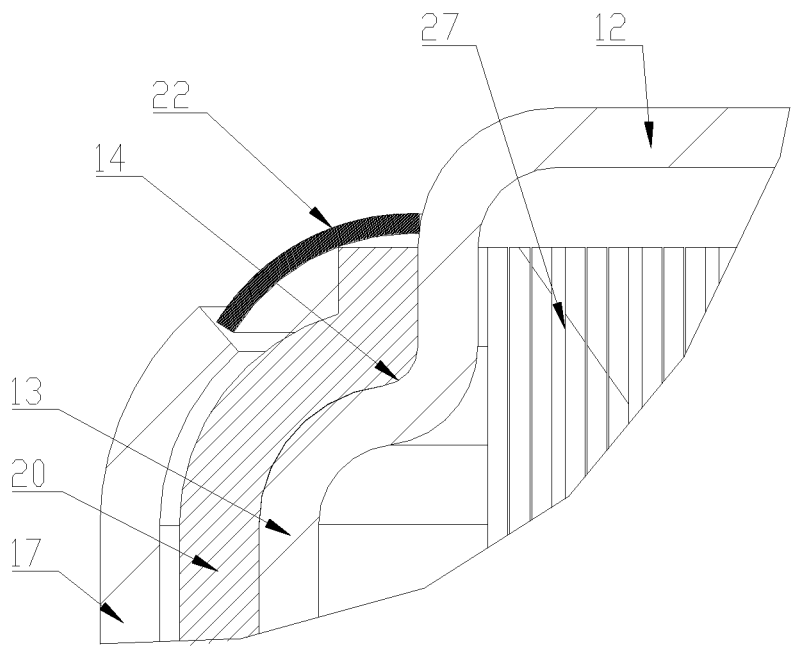
FIG. 2 is a partial enlarged view of portion A in FIG. 1.

Optionally, as shown in FIGS. 1 and 2, a stepped structure 14 is formed on the side wall 13 of the cap or on the side wall 17 of the shell, near the cover portion. For example, the step height of the stepped structure 14 is equal to the wall thickness of an external side wall. During the crimping process, the external side wall can enter the stepped structure 14 to form a wrap. With this structure, the shape of the battery is more flat.

In addition, the stepped structure 14 enables positioning of the cap 11 and the shell 15 to be more accurate during assembling, so that mounting accuracy is improved.

The battery cell 27 can be manufactured by winding or laminating. An electrolyte of the battery cell 27 may be a liquid electrolyte, a solid electrolyte or a semi-solid electrolyte. For example, the electrolyte is provided on a diaphragm separator of the battery cell 27 by soaking, injecting, or directly coating.

The ring seal 20 is located between the side wall 13 of the cap and the side wall 17 of the shell. For example, the ring seal 20 is elastic and is configured to seal the cap 11 and the shell 15 to form the hermetic space. The ring seal 20 is further configured to insulate the cap 11 from the shell 15, namely, to insulate the positive electrode from the negative electrode.

In this example, the ring seal 20 can shrink or be torn when reaching a set temperature, so as to form a slit between the side wall 13 of the cap and the side wall 17 of the shell for pressure releasing. When the ring seal 20 shrinks, a slit is formed between the side wall 17 of the shell and the side wall 13 of the cap, and gas leaks through the slit. When the ring seal 20 is torn, the ring seal 20 itself forms a slit through which the slit leaks. Those skilled in the art can select the material of the ring seal 20 according to practical needs to meet a temperature requirement during pressure releasing.

In an embodiment of the present disclosure, the ring seal 20 shrinks or is torn when reaching the set temperature, so that pressure can be automatically released when a gas pressure inside the cylindrical or button battery is too high. Thus, explosion of the battery is effectively prevented, thereby improving the safety of the battery, and reducing a potential safety hazard.

In addition, pressure in the cylindrical or button battery can be automatically released without an additional pressure release valve. In this way, the cost of the battery is reduced, and a manufacturing process of the battery is simplified.

In an example, the ring seal 20 is configured to shrink or be torn at or above 100° C. This temperature condition ensures the use safety of the cylindrical or button battery.

In an example, the material of the ring seal 20 includes thermoplastic plastics of at least one of PET (Polyethylene Terephthalate), PE (Polyethylene), PP (Polypropylene), ABS (Acrylonitrile Butadiene Styrene), EVA (Ethylene Vinyl Acetate Copolymer) and PVC (Polyvinyl Chloride). The above materials have the property of shrinking or being torn at a high temperature. In the case that short circuit, overcharging, overloading or external heating occurs to the battery, the ring seal 20 shrinks or be torn, so that high-pressure gas inside the battery is released from a portion between the cap 11 and the shell 15, thereby avoiding ignition or explosion caused by the high temperature of the battery.

Figure 3:
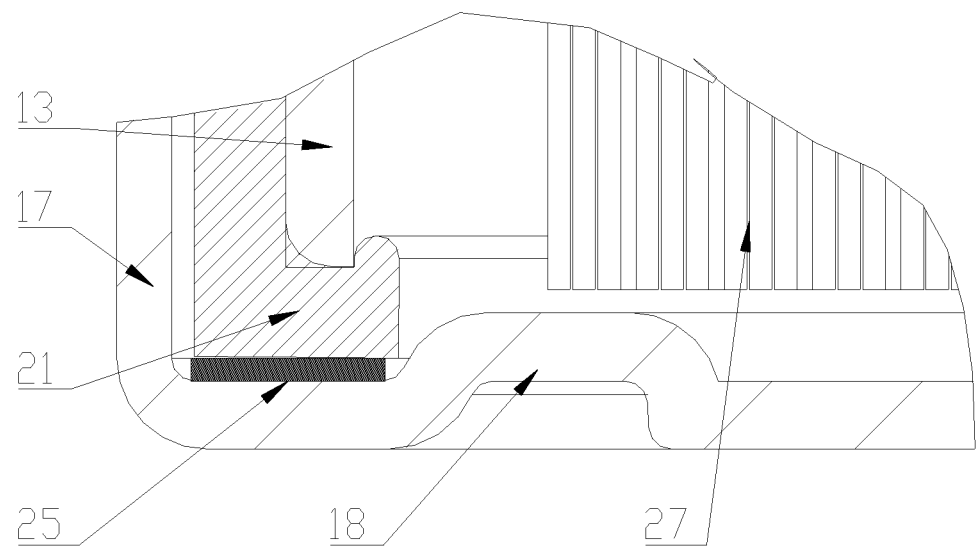
FIG. 3 is a partial enlarged view of portion B in FIG. 1.

In an example, as shown in FIGS. 1 and 3, the cap 11 is located inside the shell 15. A bottom of the ring seal 20 is of a U-shaped structure 21 which wraps a lower end of the side wall 13 of the cap. In this structure, an outer side of the U-shaped structure 21 abuts against the cover portion 16 of the shell, and an inner side of the U-shaped structure 21 abuts against a lower end surface of the side wall 13 of the cap. Therefore, a sealing area of the ring seal 20 is increased, and a sealing effect between the cap 11 and the shell 15 is enhanced.

In addition, the U-shaped structure 21 prevents the cap 11 and the shell 15 from being in contact with each other, thereby avoiding a short circuit between the cap 11 and the shell 15.

In another example, the bottom of the ring seal 20 is of an L-shaped structure abutting against the lower end surface of the side wall 13 of the cap. The outer side of the L-shaped structure abuts against the cover portion 16 of the shell, and the inner side of the L-shaped structure abuts against the lower end surface of the side wall 13 of the cap. Thus, similarly, the sealing area of the ring seal 20 is increased, so that the sealing effect between the cap 11 and the shell 15 is better.

In addition, the L-shaped structure 21 prevents the cap 11 and the shell 15 from being in contact with each other, thereby avoiding the short circuit formed by the cap 11 and the shell 15.

In an example, as shown in FIG. 3, a sealing gasket 25 is further provided between the U-shaped or L-shaped structure 21 and the cover portion 16 of the shell. Good compatibility between the sealing gasket 25 and the ring seal 20 can effectively reduce forming of slits between them, and further improves the sealing effect. For example, the sealing gasket 25 and the ring seal 20 are made of the same material. In other examples, the material of the sealing gasket 25 may be, but is not limited to, rubber, silicone, plastic, and the like.

During assembling, as the ring seal 20 has greater hardness, it is difficult to bend the lower end of the ring seal 20 to form the U-shaped or L-shaped structure 21. In an example, prior to assembling, first, the ring seal 20 is soaked in sealant glue. The sealant glue is resin glue, for example. The ring seal 20 is softened by soaking; and then, the ring seal 20 is bent. In this way, it is easy to manufacture the U-shaped or L-shaped structure 21.

In addition, the sealant glue further plays a role of a liquid seal. Further, even if uneven local thickness or wrinkles appears in the ring seal 20, it can be compensated by the sealant glue. Thus, the sealing effects between the cap 11 and the ring seal 20 and between the shell 15 and the ring seal 20 are better.

During assembling, the lower end of the side wall 13 of the cap is prone to abut and press against the cover portion 16 of the shell. This results in extremely high stress, especially when the upper end of the side wall 17 of the shell is being crimped. The stress causes the cover portion 16 of the shell to protrude outwards and cause strain, thereby spoiling the overall flatness of the battery. In order to solve this technical problem, in an example, as shown in FIG. 3, the cover portion 16 of the shell is provided with a groove 18 configured to release the stress generated during assembling.

For example, the groove 18 is a protrusion protruding into the hermetic space or protruding out of the hermetic space. During assembling, the groove 18 can provide buffer through deformation per se against the stress, thereby preventing the cover portion from protruding outwards and maintaining the flatness of the battery.

Optionally, the groove 18 is of an annular structure which can buffer against stress from all directions of the cover portion. The groove 18 has a depth of 0.2 mm. This depth can effectively absorb the strain of the cover portion.

In an example, as shown in FIG. 3, the groove 18 is of an annular structure that protrudes into the hermetic space. The outer side of the annular structure and the side wall 17 of the shell form a U-shaped structure. The U-shaped structure can press the lower end of the ring seal 20, so that it is easy to form the U-shaped structure 21 at the lower end of the ring seal 20.

In addition, the U-shaped structure of the shell 15 further enlarges the sealing area between itself and the U-shaped structure 21 of the ring seal 20, thereby enhancing the sealing effect of the cap 11 and the shell 15.

Conventionally, after the assembling of the cap 11, the shell 15 and the ring seal 20, an external slit is likely to form therebetween. For example, an external slit may be located where the shell 15 is crimped. Since the external slit is exposed, the flatness of the battery is degraded. During use of the battery, e.g. when a person picks the battery up or puts it down with his/her hand, or during a salt spray test, salt in human sweat or salt in the salt spray test accumulates in the external slit. Under certain humidity, the salt enables the cap 11 and the shell 15 to conduct, that is, the positive electrode is electrically conducted to the negative electrode. In this way, when not in use, the battery slowly discharges due to microcurrent formed in the battery.

To solve this problem, in an example, as shown in FIGS. 1 and 2, the battery further includes a filler 22. The filler 22 is an insulating material, and covers an external slit between the shell 15 and the cap 11. With the filler 22, the external slit is covered, so that the flatness of the battery is improved, and salt accumulation between the cap 11 and the shell 15 is reduced or even avoided, thereby effectively avoiding occurrence of the microcurrent in the battery and greatly reducing discharge of the battery therefrom.

It should be noted that the salt accumulation occurs at external edges of the battery, making the technical problem of the battery discharge by itself a hard-to-discover problem. Therefore, the technical task to be accomplished or the technical problem to be solved by the embodiment of the present disclosure has never been conceived or expected by those skilled in the art, and the embodiment of the present disclosure is a novel technical solution.

In an example, the filler 22 is a three-proofing glue or asphalt. For example, the three-proofing glue is silicone-modified resin glue. The three-proofing glue and the asphalt can be softened when reaching a set temperature (for example, at or above 85° C.), so that a three-proofing glue protection layer loses its sealing function before the ring seal shrinks or is torn, thereby avoiding interference to a pressure outlet.

In addition, after solidification, the three-proofing glue is smooth in surface and has a small specific surface area. Thus, the three-proofing glue is free from salt accumulation.

The asphalt can also play an excellent role in covering and insulation.

In an example, the battery further includes a protective element (not shown). The protective element is configured to prevent the cylindrical or button battery from overcharging, overdischarging, a short circuit and/or overloading.

For example, the protective element is located outside the hermetic space. A positive electrode tab 23 of the battery cell 27, the cap 11 and a positive electrode terminal of the protective element are sequentially connected in series. A negative electrode tab 26 of the battery cell 27, the shell 15 and a negative electrode terminal of the protective element are sequentially connected in series. For example, laser welding is adopted for connection. The protective element has a contact for electrically connecting to an external circuit.

For example, the protective element is located in the hermetic space. The positive electrode tab 23 of the battery cell 27, the positive electrode terminal of the protective element and the cap 11 are sequentially connected in series. The negative electrode tab 26 of the battery cell 27, the negative electrode terminal of the protective element and the shell 15 are sequentially connected in series. For example, laser welding is adopted for connection.

For example, the protective element is a protective chip. The protective chip shuts off a circuit between the positive electrode and the negative electrode when the battery is overcharged, overdischarged, short-circuited or overloaded, so as to play a protection role. The protective element significantly improves the safety of the battery.

In an example, the protective element is further integrated with a MOS switch, a PTC unit, and an NTC unit. The MOS switch can prevent the battery from being damaged by surge current.

In addition, the battery will be damaged if the temperature during charging is too high or too low. When the temperature is too high, the PTC unit shuts off a charging circuit to prevent the battery from being damaged by the high temperature. When the temperature is too low, the NTC unit shuts off the charging circuit to prevent the battery from being damaged by the low temperature.

Conventionally, both the cover portion 12 of the cap and the cover portion 16 of the shell of the battery are welded with electrode sheets, e.g., L-shaped nickel pieces. Each of the two electrode sheets is welded with a single-strand enameled wire 24, respectively. The single-strand enameled wires 24 are electrically connected to the external circuit. In this way, the electrode sheets occupy a certain space, and the height of the battery is increased, which is disadvantageous for mounting of the battery into a relatively small space.

In order to solve this technical problem, in an example, as shown in FIG. 1, the battery further includes single-strand enameled wires 24 for connecting an external circuit. The single-strand enameled wires 24 are directly welded onto at least one of the cap 11 and the shell 15. For example, the single-strand enameled wires 24 are welded onto the cover portion 16 of the shell and/or the cover portion 12 of the cap, through laser welding or resistance welding. In this way, the height of the battery is reduced, so that the battery can adapt to a smaller mounting space, thereby improving the adaptability of the battery.

In addition, in this way, the material of the battery is saved, and a processing process of the battery is simplified.

While certain specific embodiments of the present disclosure have been illustrated by way of example, it will be understood by those skilled in the art that the foregoing examples are provided only for the purpose of illustration and are not intended to limit the scope of the present disclosure. It will be understood by those skilled in the art that the foregoing embodiments may be modified without departing from the scope and spirit of the invention. The scope of the present disclosure is subject to the attached claims.

The invention claimed is:

1. A cylindrical or button battery, comprising a cap, a shell and a ring seal, wherein:
   the cap and the shell are both of a tubular structure having a cover portion, and are fitted together to form a hermetic space for accommodating a battery cell; and
   the ring seal is located between a side wall of the cap and a side wall of the shell, and is capable of shrinking or being torn when reaching a set temperature so as to form a slit between the side wall of the cap and the side wall of the shell to release pressure,
   wherein a groove is formed in the cover portion of the shell, the groove is of an annular structure that protrudes into the hermetic space, an outer side of the annular structure and the side wall of the shell form a U-shaped structure, to press a lower end of the ring seal.

2. The cylindrical or button battery according to claim 1, wherein the ring seal is configured to shrink or to being torn at or above 100° C.

3. The cylindrical or button battery according to claim 1, wherein a material of the ring seal includes at least one of Polyethylene Terephthalate (PET), Polyethylene (PE), Polypropylene (PP), Acrylonitrile Butadiene Styrene (ABS), Polyvinyl Chloride (PVC) or Ethylene Vinyl Acetate Copolymer (EVA).

4. The cylindrical or button battery according claim 1, wherein the cap is located inside the shell; and
   a bottom of the ring seal is of a U-shaped structure wrapping a lower end of the side wall of the cap; or,
   the bottom of the ring seal is of an L-shaped structure abutting against a lower end surface of the side wall of the cap.

5. The cylindrical or button battery according to claim 1, wherein the ring seal is soaked in sealant glue prior to assembling, and then is bent.

6. The cylindrical or button battery according to claim 1, further comprising a tiller, wherein the filler is an insulating material, an external slit is formed between an end of the ring seal and the cap and the shell, the external slit is located where the shell is crimped, and the filler covers the external slit.

7. The cylindrical or button battery according claim 6, wherein the tiller is asphalt.

8. The cylindrical or button battery according to claim 1, further comprising a protective element, wherein the protective element is configured to prevent the battery from overcharging, overdischarging, short circuiting and/or overloading.

9. The cylindrical or button battery according to claim 1, further comprising a single-strand enameled wire for connecting to an external circuit, wherein the single-strand enameled wire is directly welded onto at least one of the cap and the shell.

10. The cylindrical or button battery according to claim 5, wherein the ring seal is totally soaked in the sealant glue.

11. The cylindrical or button battery according to claim 5, wherein the ring seal is partially soaked in the sealant glue.

12. The cylindrical or button battery according to claim 6, wherein the filler is three-proofing glue.

\* \* \* \* \*